United States Patent [19]

Miller, Jr.

[11] 3,877,442

[45] Apr. 15, 1975

[54] 4-STROKE DISPLACEMENT GAS TURBINE ENGINE OR PUMP

[76] Inventor: Lloyd E. Miller, Jr., 8330 SW 52nd Ave., Miami, Fla. 33143

[22] Filed: Oct. 5, 1973

[21] Appl. No.: 404,011

[52] U.S. Cl. ............... 123/8.45; 418/169; 418/191
[51] Int. Cl. ...... F02b 53/00; F01c 1/08; F04c 17/04
[58] Field of Search .......... 123/8.45; 418/191, 225, 418/227, 169, 170, 171

[56] References Cited
UNITED STATES PATENTS

| | | | |
|---|---|---|---|
| 763,868 | 6/1904 | Exline | 418/227 X |
| 1,467,944 | 9/1923 | Mason | 418/227 |
| 1,580,808 | 4/1926 | Borden | 418/227 |
| 2,920,576 | 1/1960 | Pedersen | 418/227 |

FOREIGN PATENTS OR APPLICATIONS

| 988,951 | 5/1951 | France | 418/227 |
|---|---|---|---|

Primary Examiner—C. J. Husar
Assistant Examiner—Michael Koczo, Jr.

[57] ABSTRACT

A positive displacement device employing a pair of parallel gear wheels having circularly disposed teeth on their faces which intermesh to define sealed working chambers within a generally annular cavity. These chambers each compress and expand twice per one revolution of the wheels, enabling the device to be employed as a 4-stroke gas turbine combustion engine or for separate or combined pump and fluid motor applications.

13 Claims, 6 Drawing Figures

4-STROKE DISPLACEMENT GAS TURBINE ENGINE OR PUMP

BACKGROUND OF THE INVENTION

1. Field of the Invention

This invention relates to a rotary positive displacement device employing a pair of intermeshing gear wheels which produce a dual volumetric displacement, that is, two compression and two expansion functions per one revolution of these wheels.

In the principal embodiment of the invention the device is configured as a displacement gas turbine engine having the capability of 4-stroking. This provides that the engine can sequence continuously and simultaneously through the phases of intake, compression, expansion and exhaust via simple ports.

Other applications of the device are as a gas or liquid pump, compressor or expansion motor. The dual displacement aspect permits ideal use as a turbocharger for piston engines where one displacement section of the 4-ported device be used as the compressor thereof while the opposite section is used as the turbine for the further expansion of engine exhaust gases. Alternatively, the two separate displacement sections of the device may be used in parallel for handling the same fluid.

A 2-ported device involving only a singular compression and expansion is also embodied in the invention.

2. Description of Prior Art

Until the present invention, the primary objective of rotary engine design was not fulfilled. This objective was the attainment of speeds exceeding those of piston engines for the purpose of developing either more horsepower, a reduction in weight or reduced vibration and noise. Limited speeds in many proposed designs were due primarily to orbital rotors or vanes which induced high frictional losses from centrifugal force in the carrier or eccentric bearings of these members. Frictional losses quickly reached astronomical magnitude in proportion to the square of engine speed. As a consequence, speeds were restricted to lower ranges where expansive seals were then required to maintain working pressures. These, in turn, produced more friction.

An example is the currently popular Wankel engine, U.S. Pat. No. 2,988,065, wherein a triangular rotor orbits in a figure-8 or nearly oval housing. The Wankel-equipped Japanese Mazda automobile, accordingly, has its engine speed red-lined at 7,000 RPM, a speed lower than that of many comparable piston engines, and if this speed is exceeded, the eccentric rotor bearing will fail. This is readily appreciated if, say, such a rotor weighs 5 pounds, operates in a 1-inch eccentric whose shaft speed is 10,000 RPM, the centrifugal force in the rotor bearing would exceed 13,000 pounds.

Figure 1:
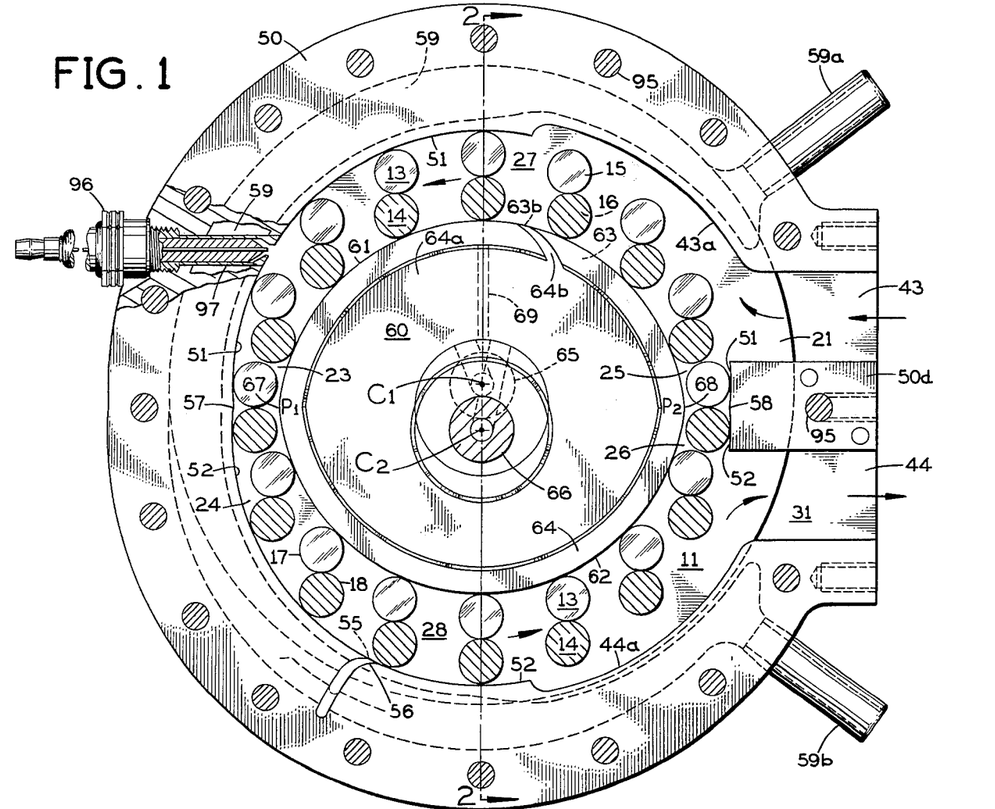
FIG. 1 is an axial view of the interior of the 4-stroke displacement turbine engine as constructed in accordance with principles disclosed in the description of the invention.

Another example, more closely related to the present invention, is the 4-stroke rotary engine of Flind in U.S. Pat. No. 1,922,477. Orbital vanes are therein carried between sets of pins which extend from parallel wheels. Centrifugal force loads these vanes against the bearing surfaces of the supporting pins and the frictional loss in such, as in the Wankel engine, to impose a limitation on operating speed. In FIG. 1 of the Flind patent, if the wheels are, say, 6 inches in diameter at the pins and the combined weight of the vanes is one pound, a vane as shown in the radial attitude would exert a centrifugal force of 650 pounds against its outer pin at 10,000 RPM. Obviously, the resultant friction would be prohibitive at this exemplary speed, and a practical speed would have to be considerably lower.

In my U.S. Pat. No. 3,728,049, entitled, Positive Displacement Compressor/Turbine, speed restriction is also required to prevent failure in the bearings of the orbital rotor blades.

It may be seen, therefore, that an engine or pump which employs planetary rotors or vanes is limited in speed because of centrifugally-induced bearing friction. As will hereinafter become apparent, the present invention dispenses with orbital parts and instead uses a pair of gear wheels which rotate on fixed centers where centrifugal force manifests itself not in the wheel bearings as a frictional loss but only as an internal stress in the rotative elements. The speed, as in a reaction turbine, is then limited only by the rupture stress within these elements. High speed operation further provides that friction-producing expansive seals be employed less extensively than in a lower speed engine.

The term "displacement turbine" applies to a class of positive displacement machines like the Lysholm screw turbine, as described in U.S. Pat. No. 2,174,522, which may also be reversibly employed as displacement compressors. These employ sealed working chambers in conjunction with dynamic vanes for the more efficient compression or expansion of gases over a broader or more variable speed range than that afforded by purely dynamic type turbines or compressors. Such machines, prior to the present invention, involved only a single volumetric displacement and were, therefore, unsuitable as engines unless a compressor and turbine unit were used jointly, an example of which is described in the Lindhagen patent, U.S. Pat. No. 2,799,253. This configuration in turn caused overheating of the turbine section, as occurs in dynamic type gas turbine engines, requiring the restriction of combustion temperatures and rotor speeds. As will hereinafter become more obvious, these problems are overcome by the present invention which provides a dual displacement, that is, the functions of compressor and turbine in a single novel mechanism.

SUMMARY OF THE INVENTION

The invention thus provides a displacement gas turbine engine or positive displacement pump or motor in which a pair of parallel gear wheels are rotatable on separated axes. Gear teeth are circularly disposed on the face of each wheel and project to the opposite wheel to intermesh with the teeth thereof. A housing member is sealingly disposed between the wheels so as to enclose the teeth thereof. The interior of the housing is configured as parallel intersecting cylinders, the axes of the wheels being coincident, respectively, with the axes of these cylinders. A core member is sealingly disposed between the wheels and is supported within the cage defined by the teeth of the wheels. The core has exterior curved surfaces which are intersecting arcs circumscribed respectively from the axes of the wheels. The housing and core members in conjunction define a generally annular track in which the teeth revolve. The teeth effect sealing contact with the opposite wheel and with the teeth thereof and with the interior cylindrical surfaces of the housing and with the exterior curved surfaces of the core to divide the track into sealed working chambers whose volumes each contract and expand twice during one revolution of the wheels.

Port means are provided for the ingress and egress of fluid, respectively, to and from these chambers.

The principal object of the invention is the provision of a displacement gas turbine engine operable on the 4-stroke cycle and whose speed is not encumbered by rotating planetary components.

A second object of the invention is the provision of an engine with no more than two basic moving parts which are each rotatable on fixed centers, where these parts are statically and dynamically balanced for high speed operation.

A third object of the invention is the provision of a combustion engine wherein the same operable elements serve both for intake and compression functions then later for power and exhaust functions, so that sequential exposure to relatively cool intake air may serve to reduce the temperature of elements previously heated by exposure to high temperature combustion gases.

Another object of the invention is to provide an engine or displacement device in which the rotating abutments thereof serve both as positive displacement piston elements as well as like turbine blades for effecting dynamic compression or expansion.

Still another object of the invention is the provision of an engine or positive displacement device operable in a high speed range not requiring nor limited by friction-producing expansive seals to maintain working pressures.

Other objects, advantages and features of the invention will be apparent from the following detailed description when read in conjunction with the accompanying drawings.

DESCRIPTION OF THE PREFERRED EMBODIMENT

Figure 2:
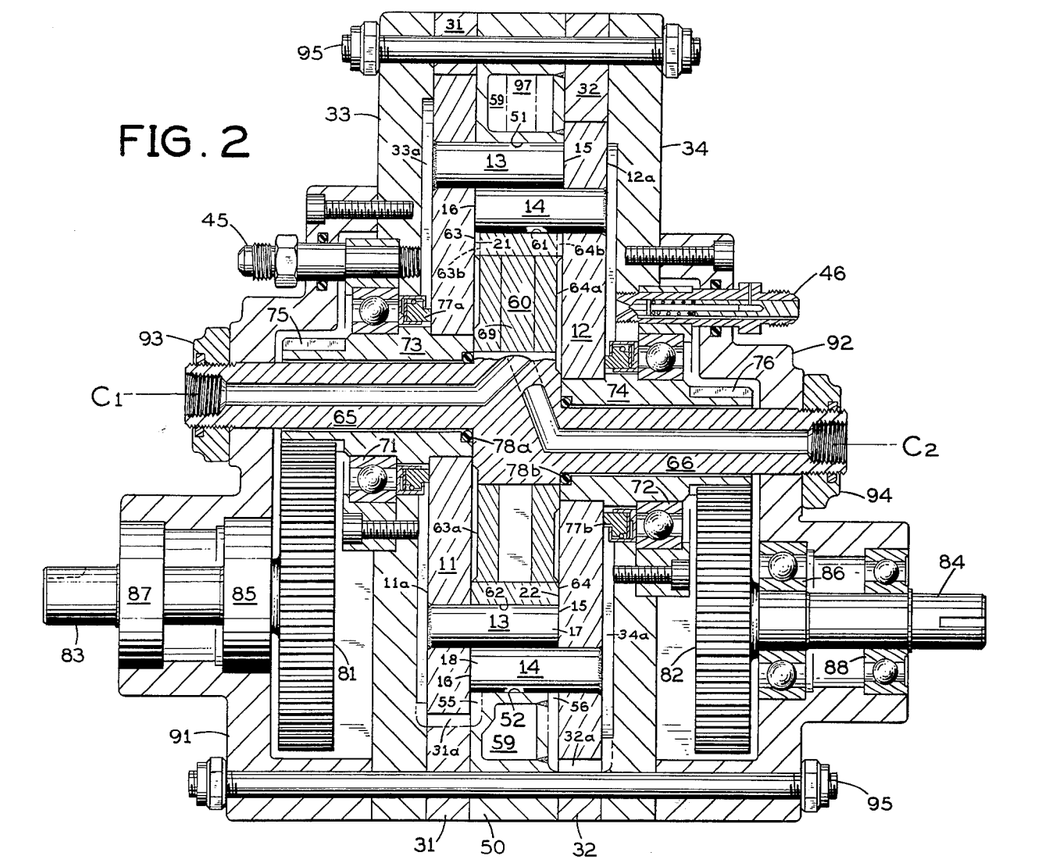
FIG. 2 is a sectionalized side elevation view of the engine shown in FIG. 1 illustrating the cylindrical gear teeth employed in this principal embodiment as well as the wheels to which the teeth are attached and bearings which support the wheels for rotation.

With reference to FIGS. 1 and 2, a 4-stroke displacement gas turbine engine is illustrated embodying a pair of identical gear wheels 11, 12 which intermesh and rotate together in a counterclockwise direction at a 1:1 ratio. The wheels are supported for rotation on bearings 71, 72 within the housing 50 on separated but parallel axes $C_1$, $C_2$. Sixteen cylindrical pins constituting gear teeth 13, 14 are press-fitted, then welded, into reamed holes in each of the disc-like wheels. These holes are drilled parallel with the wheel axis of rotation and are evenly spaced in 22½° increments in a circle of constant radius about the wheel center. The pitch circle of the pins is of such a diameter that the spaces between teeth is the minimum to provide clearance for teeth of the opposite wheel which mesh therewith. The rotational axes of the wheels are separated an amount equal also to the tooth diameter. The number of teeth employed is somewhat arbitrary but should not be less than the 16 per wheel shown, least excessive leakage occur between wheels; this leakage will be hereinafter described. The lengths of the pins are equal for both wheels, having been face-ground on the unsupported ends or faces after welding. Because the pins are cantilevered from the wheels, the exposed length of the pins should not be more than twice the pin diameter to prevent centrifugal deflection and binding of the unsupported ends during high speed rotation. In operation, the faces 15, 16 of the pins contact the faces 21, 22 of the opposite wheel in sealing contact. Each pin has a mate on the opposite wheel and the cylindrical surface 17 of each pin 13 maintains sealing contact at all times with the cylindrical surface 18 of its mating pin 14. The relative motion of each set of mating pins during rotation of the wheels is analogous to that as when a person twiddles his thumbs. As may be seen in FIG. 1, a set comprises one pin 13 from the upper wheel 11 and one pin 14 from the lower wheel 12, the pins of the lower or near wheel being cross-hatched inasmuch as the disc portion thereof has been omitted in the drawing for clarity. It is to be noted that other embodiments of the invention are depicted using the same convention.

As may be further seen in FIG. 1, a line drawn through the centers of each set of pins remains parallel at all times during rotation to the centerline through the axes $C_1$, $C_2$ of the two gear wheels. Expressed differently, a line through each set of pins assumes a radial attitude with respect to the wheel centers twice during one revolution of the wheels. Also, the same line through each set of pins is tangential to the wheel centers at two other points during rotation. These radial positions occur 180° apart as do the tangential positions, whereas the radial with respect to the tangential positions are 90° apart. At intermediate positions, of course, a line through each set of pins varies proportionately from a radial attitude to a tangential one. The combined breadth of each set of pins rotating through the radial positions comprises a moving abutment which sealingly contacts fixed abutment surfaces to serve as both a displacement piston and a dynamic vane. As rotation continues toward the tangential positions, the combined breadth of each set of pins effectively diminishes as the pins from each wheel merge into single-file passage through what comprises a narrow "pass" $P_1$, $P_2$ between converging fixed abutments. These abutments are defined as the inner semi-cylindrical walls 51, 52 of the housing 50 and the outer curved surfaces 61, 62 of the fixed core member 60. The curvatures thereof are intersecting arcs circumscribed about the wheel axes $C_1$, $C_2$. The upper inner walls 51 of the housing are contacted during rotation by the outermost radial surfaces 17 of the pins 13 of the upper wheel 11 while the lower curved surface 62 of the fixed core 60 is contacted by the innermost radial surfaces of these pins of the same wheel, both surfaces being radiused from the upper wheel axis $C_1$. The opposite set of surfaces 52, 61 are similarly contacted by the sides 18 of the pins 14 of the lower wheel 12 and are radiused from the lower wheel axis $C_2$.

The width of the oppositely-disposed passes $P_1$, $P_2$ is just sufficient, with allowance for thermal expansion, to provide passage to the cylindrical pins 13, 14. As the pins leave each pass in a counterclockwise direction they mutually broaden again as a moving abutment to maintain contact with the now-divergent inner housing walls 51, 52 and the curved surfaces 61, 62 of the core 60. As may be seen, the volumetric spaces 24, 25 defined between the sets of pins are now expanding, whereas, upon entry into the respective pass, the spaces 23, 26 were contracting in volume. Since there are two such passes $P_1$, $P_2$ spaced 180° apart, there are two contractions and two expansions for each space between each set of pins per one revolution of the wheels. Closure of the ends of these volumetric spaces is provided, as may be observed in FIG. 2, by seal contact of the faces 21, 22 of the gear wheels 11, 12 with the respective faces of the housing 50 and core 60 to comprise sealed working chambers.

As may be further seen in FIGS. 1 and 2, the fixed core member 60 is actually confined within the "cage" formed by the meshing pins 13, 14 and the faces 21, 22 of the gear wheels 11, 12. The core 60 must, therefore, be supported statically or non-rotatively by structural means which extend through the hollow shafts 73, 74 of the gear wheels to external fixed structure. This is accomplished specifically by having fixed support shafts 65, 66 which extend perpendicularly from each face 63, 64 of the core 60, coaxially through the tubular gear wheel shafts 73, 74 for attachment to the gear case covers 91, 92, the latter being attached by screws to each axial end of the engine. The core 60 and support shafts 65, 66 thereof are fabricated as a weldment whose faces 63, 64 are ground flat for rotating seal contact by the faces 21, 22 of the gear wheels 11, 12. As may be noted, the core shafts 65, 66 are eccentric with respect to each other by an amount equal to the distance between wheel centers $C_1$, $C_2$. It is this eccentricity between core shafts, when attachment is made to the gear covers 91, 92, that allows the core to be held non-rotative, as if these shafts were keyed to the covers. Adjustment stop nuts 93, 94, threaded onto the external ends of the core shafts after the gear covers have been installed, provide longitudinal centering of the core for obtaining equal clearance between the faces 21, 22 of the gear wheels and the core faces 63, 64. The core serves, therefore, like the oval in the center of a race course, to define within the housing 50 a generally annular track. The pins or teeth which revolve therein serve to divide this track into a number of sealed spaces or working chambers 27, 28 whose volumes contract and expand twice during one revolution of the gear wheels.

It is also to be noted in FIGS. 1 and 2 that the gear wheels rotate in the same direction at the same speed or at a 1:1 uniform velocity ratio. The circumferences of the pins are actually epitrochoidal curves where the generating point on a mating pin is constantly changing rather than being just a fixed point on the wheel. The method of tooth profile development for this and subsequent embodiments of the invention will be hereinafter defined. A uniform velocity ratio between wheels assures no cyclic acceleration and deceleration and hence no vibration. The employment of cylindrical gear teeth or pins provides an inexpensive method of manufacture compatible with existing machinery. Since the wheels rotate as a unit in the same direction, friction is at a minimum. The slight relative movement which occurs between wheels is due to the required separation of their axes. Friction and wear are further negated by hardening and nitriding all parts and surfaces.

Inasmuch as the fixed core 60 is supported by attachment of the core shafts 65, 66 to the gear covers 91, 92, no direct drive from the gear wheels 11, 12 is possible. Instead, as may be seen in FIG. 2, torque is transmitted to or from the gear wheels by reduction gears 81, 82 which are journalled in bearings 85, 87 and 86, 88 disposed, respectively, in the gear covers 91, 92. The reduction gears are driven by gear pinions 75, 76 which are integral with the outer ends of the tubular gear wheel shafts 73, 74, these shafts being each attached by welding to one of the gear wheels 11, 12. The main bearings 71, 72, respectively recessed in the end plates 33, 34, thus provide common rotative support for the gear wheels as well as for the pinions 75, 76. The employment of two reduction gears 81, 82 simply allows a convenient drive shaft 83, 84 at each end of the engine. The reduction gear 81 at the left in FIG. 2 is three times the diameter of its pinion 75 and provides a 3:1 reduction for coupling to an external load. The reduction gear 82 at the right has a 2.5:1 ratio and is used for driving engine accessories. It is to be clearly understood that the purpose of bringing a reduction gear out of each end of the engine is not for externally coupling the two gear wheels 11, 12 together with some sort of synchronizing countershaft. This is definitely not required as the pins 13, 14 of the gear wheels 11, 12 provide adequate coupling strength to permit full engine output to be extracted from either gear wheel, if desired. Actually, the pins do not feel the full engine torque, but only a small amount similar to the side load a piston employing a long rod experiences. The torque between pins is proportional to the sine of the angle from a pin to the wheel centers. Furthermore, compression and combustion pressures act in opposite directions, cancelling and reducing the net force between mating pins.

As will become hereinafter more apparent, reduction gears of the stated ratios are employed because of the relatively high turbine-like speeds of the engine, although for other adaptations of the invention, such as a water pump, a lower ratio to impart more torque and less speed to the gear wheels, say, from an electric motor, might be utilized. As may be also noted in FIG. 2, the engine is bilaterally symmetrical on each side of the housing 50, except for the difference in the ratios of the reduction gears or that asymmetry caused by the separation of the wheel axes $C_1$, $C_2$.

Referring again to FIG. 1, it may be seen that the engine has an intake port 43 and an exhaust port 44 which are adjacently disposed in the housing 50. These are as wide as the housing and provide the ingress of air or charge and the egress of spent combustion gases, respectively, to and from the volumetric spaces 27, 28 defined between the pins of the gear wheels, the housing walls and the fixed core. The divider block 50d, which has the same width as the housing 50, separates the ports 43, 44 and may be constructed as part of the housing, although not contiguous thereto. Instead, the block is doweled to the spacer plates 31, 32 which closely surround the gear wheels 11, 12, while being further retained by one of the 18 studs 95 which are employed to hold together the engine housing and plate components. The inner wall surfaces 51, 52 of the divider block, like the equivalent surfaces of the housing 50, are arcs circumscribed from the wheel centers $C_1$ and $C_2$, respectively. The apex 58 of these arcs is in radial alignment with the apex 68 of the core 60 to comprise the pass $P_2$ between ports 43, 44. If it were not for the housing wall being interrupted by the ports 43, 44, the pass $P_2$ disposed therebetween would have the same appearance as the pass $P_1$ disposed diametrically on the opposite side of the engine. As viewed in FIG. 1, the gear wheels 11, 12 have a counterclockwise direction of rotation, which provides that a typical space 25 is expanding from minimum volume upon exit from the pass $P_2$ at the divider block 50d. A gasoline and air mixture or charge may be, therefore, drawn into these expanding spaces 25 through the always-open intake port 43 from a carburetor (not shown). To provide that the spaces 25 between the pins are adequately supplied with charge during their expansion, the inner wall of the housing is relieved or cut away so as to continue the intake process through a sector 43a which extends to the point where the spaces have attained full volume, this point being slightly less than 90° from the intake port in the direction of rotation. The full or maximum volume position may be further defined as being that point where a given space between sets of pins is centered on the centerline which passes through the wheel axes $C_1$, $C_2$.

After maximum volume has been reached, compression begins as the spaces contract during their approach toward the unported pass $P_1$, at the left in FIG. 1. The final volume to which each space is compressed is that area surrounding each pin as it goes through the pass $P_1$. This pass $P_1$, therefore, is analogous to the top-dead-center (TDC) position in piston engine terminology, and the compression ratio is equal to the maximum volume of the space divided by the final volume thereof, or approximately 5:1. This ratio can be increased by supercharging, as will be hereinafter described.

Prior to the pass $P_1$ being reached, a specially designed spark plug 96 with an extended tip fires into the moving spaces to ignite the compressed charges between sets of pins. To prevent premature firing of the spaces, high voltage impulses are supplied to the plug from an electronic pulse generator (not shown) which is synchronized to the gear wheels to provide automatic advance for variable speed and load conditions. For constant speed applications, a glow plug may be optimumly positioned in the housing wall instead of a spark plug, and the pulse generator dispensed with.

The combustion which results from ignition continues in the spaces surrounding the pins as the pins traverse the pass $P_1$. Expansion of the spaces ensues as the pins leave the pass in a counterclockwise direction. Torque is thus imparted to the gear wheels as a rise in pressure from combustion acts to expand the spaces between the pins. It is to be noted that no external flywheel, aside from the mass of the gear wheels, is required for the engine owed to the small size and multiplicity of the volumetric spaces. The effect of this multiplicity is to produce a minimum of torsional vibration, accompanied by quiet operation.

The exhaust phase begins upon completion of expansion when the spaces have again reached maximum volume. This point, likes its oppositely disposed counterpart relating to maximum volume before compression begins, occurs when the combustion spaces are centered on the centerline through $C_1$, $C_2$, at the lowest point on the wheels in FIG. 1. Exhaust occurs during the remaining quadrant of the operative cycle and extends to the pass $P_2$ at the divider block 50d. Because the spaces 26 are now shrinking in volume as they approach the pass, the housing wall, as may be seen in FIG. 1, is again relieved 44a identically as the intake side, to provide communication between the contracting spaces and the exhaust port 44. Pins emerging from the intake side of the pass $P_2$ thus initiate a new but continuous rotative cycle. Advantageously, the pins of both wheels are liberated of combustion heat by sequential exposure to the relatively cooler intake air.

While the present embodiment uses a conventional carburetor as a fuel introduction means, the engine is ideally suited for fuel injection directly into the moving spaces with no impulsing mechanism required as is used with piston engines. The engine is quite adaptable to burning a lower grade of fuel using the diesel cycle, in which case the compression ratio must be raised by supercharging.

Lubrication of the gear wheels is provided by adding oil to the gasoline in the ratio of 1:25. It is to be noted that the lubricant is totally burned during combustion since there is no port loss as in loop-scavenged 2-stroke cycle engines. Sump lubrication is provided for the reduction gears 81, 82, splash therefrom lubricating the reduction gear bearings 85, 87, 86, 88 as well as the main bearings 71, 72, all of which are common to the interior of the gear covers 91, 92. Teflon O-ring seals 78a, 78b, on the core shafts 65, 66 near the fixed core 60, prevent lubricant loss from the gear cases into the engine.

Both circulating water and steam cooling are employed in the engine. The core 60 is cooled by pumping water from an accessory water pump (not shown) through the hollow core shafts, the ends of which are tapped for pipe fittings. The core itself is hollow with a baffle plate 69 which allows cooling water to circulate therein before exiting via one of its suppport shafts. The housing 50 is jacketed 59 and cooled by the same pump, whereby water enters the inlet nipple 59a, makes a single loop around the periphery of the gear wheels and leaves via the outlet nipple 59b. The housing 50, like the core 60, is of welded construction to facilitate forming the water passages therein. The spark plug 96 is threaded into the outer wall of the housing while the tip of the plug extends through the water jacket of the housing so as to be common to the volumetric spaces of the gear wheels. A steel sleeve 97, which receives the tip of the plug, is welded between the walls of the housing at this point. The sleeve is shown by phantom lines in the plane of the paper in FIG. 2 for illustration purposes, whereas, the spark plug is actually located as it appears in FIG. 1.

Steam cooling is employed to remove heat from the back surfaces 11a, 12a of the gear wheels 11, 12. This is accomplished by spraying water or coolant onto these surfaces from injectors 45, 46 which are threaded into the end plates 33, 34 of the engine. The water injectors are supplied by a small volume high pressure pump (not shown) which is driven off of the engine accessory shaft. The resultant steam that is formed behind the wheels in the relieved areas 33a, 34a of the end plates is directed through nozzle-like orifices 55, 56 in the housing wall 52 to act upon the gear wheels as a steam turbine. Aside from the reaction effect on the pins of the gear wheels, the steam serves to increase the mean effective pressure of the expansion phase of the cycle. As may be noted by the location of the orifices 55, 56 in FIG. 1, the steam is introduced after the combustion spaces between the pins have expanded to about 75% of full volume or just before exhaust begins. This is coincident with a point where combustion pressure is beginning otherwise to fall off and the steam, therefore, increases the working pressure in this region and thus increases the mean effective pressure for the entire expansion. In FIG. 2, the channels 31a, 32a which supply the orifices 55, 56 with steam from the relieved areas 33a, 34a in the end plates 33, 34 may be seen. These appear as phantom lines, like the spark plug sleeve 97, inasmuch as they are shown for illustration purposes but do not actually lie in the sectional plane of the drawing. Not only does this regenerative use of heat and steam considerably increase the power and thermal efficiency of the engine but it provides other advantages as well. Steam pressure formed in the relieved areas 33a, 34a acts upon the back surfaces 11a, 12a of the gear wheels to react and cancel the thrust load which is being applied to the engine bearings 71, 72. This thrust arises from compression and combustion pressures which are attempting to push the gear wheels apart. Accordingly, the pressure in the relieved areas 33a, 34a may be regulated by the amount of water injected in relation to the quantity of heat to be removed. The pressure may be thus varied so that the wheels apply exactly the desired sealing force to the faces 15, 16 of the pins 13, 14 of the opposite wheel and to the faces 63, 64 of the fixed core 60 and to the faces of the housing 50. As may be seen, this also provides a convenient method of accounting for the axial thermal expansion of the pins, housing and core so that optimum sealing forces may be employed in relation to engine temperature. Another advantage of the steam is that it serves as both a lubricant as well as a sealant to the perimeter of the gear wheels. As may be noted, the edges of the wheels are extended beyond the pins to comprise a labyrinth type seal in close peripheral contact with the inside diameter of the spacer plates 31, 32. The plates are several thousandths of an inch thicker than the disc portion of the gear wheels to provide rotative clearance, and are bolted between the housing 50 and the end plates 33, 34. The labyrinth seal restricts leakage from the volumetric spaces 23, 24 of the gear wheels which are experiencing compression and combustion pressures, while steam acting upon the labyrinth juncture from the back side, further opposes leakage over the wheels. Steam which leaks into the juncture, especially near the lower pressure intake and exhaust sectors, lubricates the back edge of the wheels like a gas bearing, where otherwise, considerable frictional loss would occur through rotative contact with the end plates 33, 34. The purpose of the labyrinth seals is to reduce the frictional loss between the wheels and the faces of the housing which would otherwise be greater if these surfaces were sealingly fitted with sufficient contact to independently prevent leakage from the working chambers. Due to higher peripheral surface speeds, a wider clearance at these junctures is, therefore, provided in contrast to the metal-to-metal contact which occurs between the wheels and the relatively smaller diameter core faces. Clearance is controlled by making the housing 50 slightly shorter in axial length than the core 60. Carbon face seals 77a, 77b are employed at the tubular shafts 73, 74 of the gear wheels to prevent steam from entering the engine bearings 71, 72.

It is to be observed that the faces 63, 64 of the fixed core 60 are relieved 63a, 64a and that no expansive seals are employed at these junctures other than the steam force which pushes the gear wheels into sealing contact with the core faces. Gas or blow-by which does leak past the perimeter of the faces in the compression and combustion regions collects in the relief 63a, 64a of each face and is suctioned back to the intake region by vents 63b, 64b in the perimeter of the faces 63, 64 at this point. This provides, like leakage over the wheels, a regenerative return.

Since expansive seals do not lend themselves to the pin or tooth construction offered by the invention, high working pressures are maintained in part by having a relatively large number of volumetric spaces 27, 28 with a small but progressive pressure drop across each set of pins. This type of sealing, sometimes referred to as "space packing", is dependent upon high speed operation where leakage, because of the time involved, becomes negligible. But in order for high speeds to be efficiently attained, there must be an absence of friction-producing expansive seals as well as orbital parts. As may be seen, the present invention aptly satisfies these criteria.

In the succeeding embodiments of the invention, components which are similar to those used in the first embodiment carry the same part number but these numbers are preceded by 3, 4, 5, or 6, relating to the number of the drawing figure in which they appear.

Figure 3:
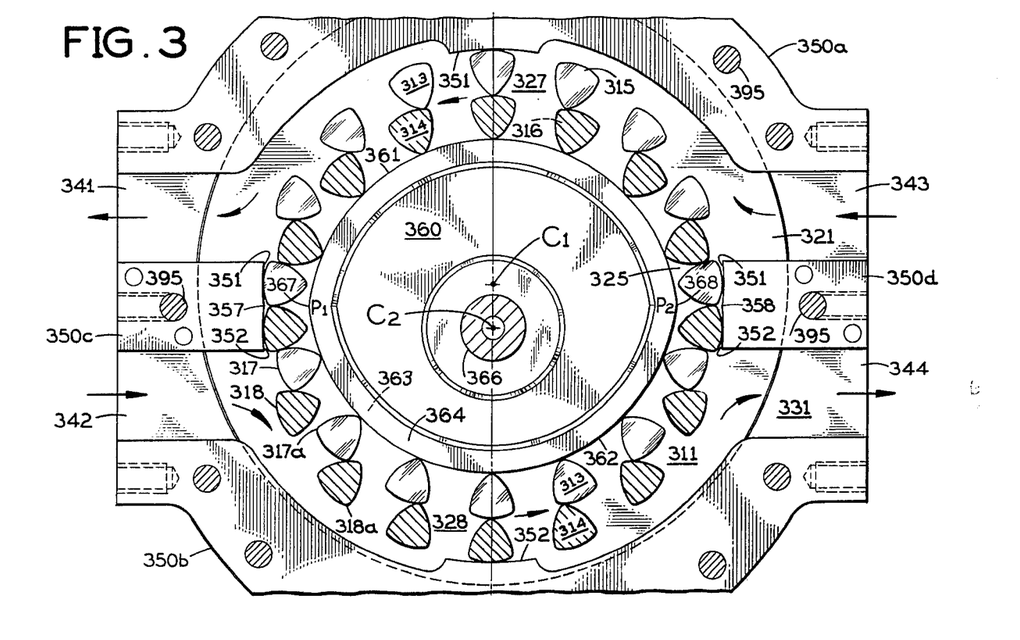
FIG. 3 is an interior axial view of a 4-port displacement device having a triangular toothform and which can be used for various combustion engine, pump or fluid motor modes of operation.

Referring now to FIG. 3, an embodiment of the invention is there illustrated which may be adapted as a combustion engine or alternatively as a combination displacement compressor and turbine, or even for separate pump or expansion motor applications. Accordingly, the device is comprised of two distinct displacement sections to produce a dual displacement, that is, the expansion and/or compression of two separate fluids. As may be seen, each displacement section is comprised of the sealed spaces which are instantly disposed in one-half of the annular track which is defined between the housing walls 351, 352 and the fixed core 360.

Four ports are employed in the embodiment of FIG. 3, each displacement section having a separate intake port 343, 342 and exhaust port 341, 344. Two alike gear wheels 311, 312 are again employed, but these are now each equipped with sixteen teeth 313, 314 whose cross sections are generally triangular rather than circular as are the cylindrical pin teeth utilized in the previous embodiment of the invention. It is to be noted that cylindrical teeth may be alternatively employed, if desired, using a 4-port housing as in FIG. 3, although the use of triangular teeth 313, 314 here demonstrates one of the several variations of tooth profiles provided by the invention. The teeth of the present embodiment are preferably formed as an integral part of the gear wheels inasmuch as they do not lend themselves to hole mounting like the pins. In cross section, the teeth resemble small Wankel rotors and are equilateral triangles having convex sides 317, 318. Like the cylindrical pins, their profiles are epitrochoidal curves generated by the mating teeth. In this case, however, the generating points are the apices 317a, 318a of the triangles and remain as fixed points on the opposite wheel. Again, as in the previous embodiment, both wheels move at a 1:1 uniform velocity ratio in the same direction, so that at all times during rotation, half of the apices 317a, 318a of the triangular teeth of each wheel are instantly generating the convex sides 317, 318 of the teeth of the opposite wheel. These teeth also remain in mating sets like the cylindrical pins and move about one another as in the twiddling thumbs analogy. It is to be noted that while the convex sides of the teeth are epitrochoidal curves, they are also true arcs which may be radiused from the opposite apex of the same tooth. The apices are also radiused slightly to prevent scoring the mating teeth. The teeth are disposed on each wheel in a circle of constant radius about the wheel center of rotation, with one of the apices of each of the teeth pointing toward this center. Spacing between teeth on the same wheel is just sufficient to allow clearance at the passes $P_1$, $P_2$ for the meshing teeth of the opposite wheel. Tooth width, measured tangentially, is approximately equal to the separation between wheel centers. Tooth length, measured axially, may be twice the tooth width, and as before, the faces 315, 316 of the teeth contact the faces 321, 322 of the opposite wheel in sealing contact. The faces of the wheels also, respectively, contact the faces 363, 364 of the fixed core 360. The radially-innermost apices of the wheels contact the curved surfaces 361, 362 of the core, while the radially-outermost convex sides of the teeth contact the inner surfaces 351, 352 of the housing 350. The combined contact, as in the previous embodiment, is such as to define sealed volumetric spaces 327, 328 between sets of teeth whose volumes compress and expand twice during one revolution of the gear wheels. The spacer plates, end plates, bearings and other components are typical in construction of those shown in the engine embodiment of FIG. 2.

The employment of four ports as in FIG. 3, in contrast to the 2-ported engine embodiment of the invention, requires that the housing be now comprised of four separate pieces. These are the two principal halves 350a, 350b and the two divider blocks 350c, 350d, the blocks being spaced between the halves to define four individual ports 341, 342, 343, 344. As in the previous embodiment, the divider blocks have inner surfaces 351, 352 which are intersecting arcs circumscribed, respectively, from the wheel centers $C_1$, $C_2$. The apices 357, 358 of the arcs of the blocks are similarity aligned and spaced from the apices 367, 368 of the fixed core 360 an amount equal to the radial depth of the triangular teeth so as to define two oppositely disposed passes $P_1$, $P_2$. Inasmuch as ports are now provided on each side of each pass, the housing wall is principally relieved, except for two short arcs 351, 352 which lie on the centerline through the wheel centers $C_1$, $C_2$; each arc is radiused from the nearest of these centers. Fluid taken in at the upper intake port 343 in FIG. 3 will, therefore, be expulsed from the next exhaust port 341 in the direction of wheel rotation, as the volumetric spaces 325 between the teeth 313, 314 enlarge upon leaving the right-hand pass $P_2$ and shrink in volume upon approaching the left-hand pass $P_1$. A similar displacement will occur between the lower intake port 342 and exhaust port 344. This is in contrast to the 2-ported engine of FIGS. 1 and 2 where the pass $P_1$ at the left in FIG. 1 was unported and where compressed combustion gases were deliberately carried through that pass, around the pins, for expansion within the engine. The 4-ported device, on the other hand, behaves like two separate pumps, so that fluid or gas carried through its passes $P_1$, $P_2$ now represents an inefficiency or an unwanted recycling or exchange of fluid between each displacement section of the device. This inherent leakage through the passes, as should be obvious, relates to the residual spaces between meshing teeth at the passes as a result of their generated profiles. When the device is employed in an application in which the same type of fluid is used in both displacement sections, the exchange of fluid through the passes may not pose a contamination problem between fluids.

One such application of the device would be as a combustion engine employing a separate combustion chamber. This would be in contrast to the FIG. 1 embodiment wherein combustion occurred completely within the housing of the engine. The chamber, not shown, but simply a gas-tight container, would be connected across the exhaust port 341 and intake port 342, at the left in FIG. 3. The upper displacement section of the device would serve as the compressor, while the lower displacement section served as the turbine. As in the FIG. 1 embodiment, intake air would be drawn in through the intake port 343, at the upper right in FIG. 3, compressed by the upper teeth of both wheels, and forced through the exhaust port 341 into the combustion chamber. Because of hotter surfaces in the chamber, a lower grade of fuel, such as kerosene, could be burned, being ignited in the chamber by a glow plug in the conventional manner. The combustion gases from the chamber would then be re-admitted to the lower intake port 342, at the left in FIG. 3, for expansion across the turbine section, that is, the lower part of the wheels. Spent gases would leave the engine via the exhaust port 344, at the lower right. Power to drive the compressor section of the wheels would be thus derived from the turbine section of the wheels, the surplus therefrom being directed to the engine output reduction gears. Cooling of the teeth is provided, as in the FIG. 1 embodiment, by repetitive exposure to combustion gases and then to relatively cooler intake air.

Another application of the device shown in FIG. 3 is as a turbocharger for scavenging service with a piston engine. One displacement section of the device would there be used as a compressor for supercharging the piston engine's air intake while the opposite displacement section would serve as a gas turbine for further expansion of exhaust gases from the engine. In this instance it would be unnecessary that the device, as a turbocharger, be shaft-driven from the parent engine, as the gear wheels thereof would be free-running, that is, the turbine section would drive the compressor section through engagement of the gear teeth of the wheels. Cooling of the teeth by exposure to intake air would permit higher combustion temperatures than in conventional turbochargers employing separate compressor and turbine units. Of course, the device could also be similarly employed as a turbocharger for use with the 4-stroke engine shown in FIGS. 1 and 2.

As an air compressor, water pump or fluid expansion motor, the device of FIG. 3 may be employed with its two displacement sections connected in parallel. In this case the two intake ports would be piped jointly from the same fluid source while the two exhaust ports would discharge into a common sink. Leakage or fluid transfer through the passes would be inconsequential.

Figure 4:
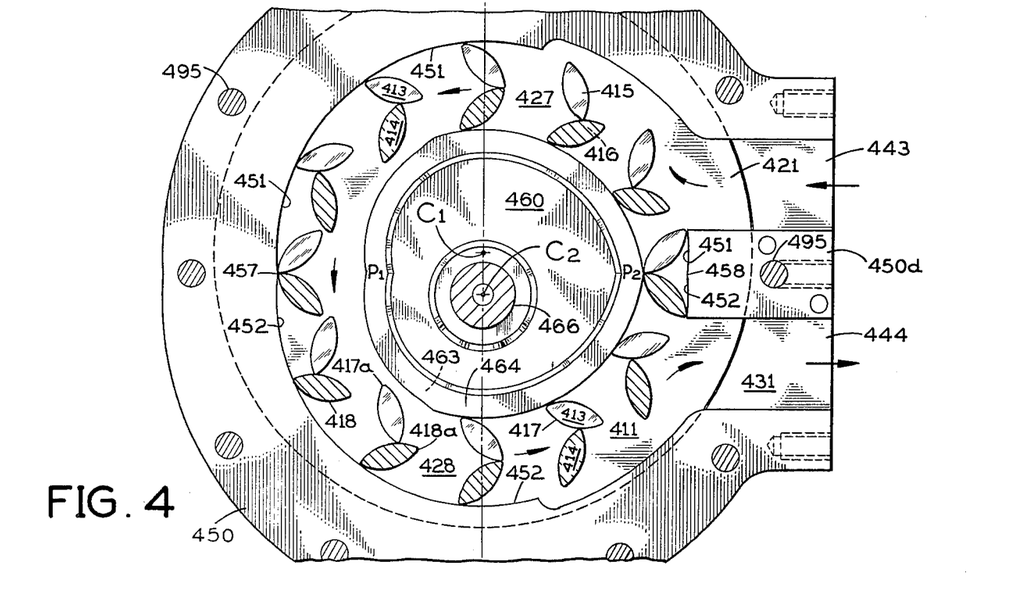
FIG. 4 is an exposed axial view of a 2-port displacement device having quasi-elliptical vane-like teeth.

In FIG. 4, another embodiment of the invention is shown wherein the meshing gear wheels 411, 412 have quasi-elliptical teeth or vanes 413, 414 which resemble the blades in a squirrel cage blower. As in the preceding embodiments, the wheels rotate together in the same direction at a 1:1 ratio. The vanes are canted or raked in the same direction on both wheels. When viewed through the two wheels in the assembled device, however, the vanes of each wheel cant in opposite directions. If the wheels are removed and placed side-by-side with the vanes toward the viewer, it is seen that the vanes of both wheels cant in the same direction and that the wheels are identical. The wheels may be designed with right or left-hand canted vanes, but both wheels must be of the same hand. The practical limit of cant of 45°, measured from the radial, and when this angle is employed, as in the FIG. 4 embodiment, the vanes have reduced minor cross sectional axes for aerodynamic advantage while the major cross sectional axes of the mating vanes of opposite wheels remain always at 90° to each other during rotation. The vanes similarly extend from the face of the wheels, as do the teeth in the preceding embodiments, and are evenly spaced in a circle of constant radius about the wheel axes. The apices 417a, 418a of the vanes of one wheel generate the convex sides 417, 418 of the mating vanes of the opposite wheel. The separation between wheel axes $C_1$, $C_2$ is equal to the projected vane width, measured tangentially. Although a greater number of vanes could be employed, if desired, twelve per wheel are here utilized to demonstrate a minimum practical vane arrangement. The wheel diameter and width of the spaces between vanes are such that the apices 417a, 418a of mating vanes touch at the passes $P_1$, $P_2$ and when sets of vanes are on the centerline through $C_1$, $C_2$. At intermediate positions between these points, of course, the vanes are in varying degrees of engagement. The sides of the vanes are epitrochoidal curves, as are the teeth in the preceding embodiments, but are also true arcs whose radii are equal to the vane width, measured tangentially. The apices of the vanes are the intersections of these arcs and are radiused slightly to prevent gouging of the sides of the mating vanes during engagement.

If the vaned wheels, shown in FIG. 4, are operated in a 4-port housing, as is used in the embodiment of FIG. 3, a dual displacement will be produced. For this type of application, however, the vane toothform has several disadvantages. The first is a low compression ratio at the pass $P_2$, meaning that excessive fluid is carried through the pass between the vanes. The second is, that at the opposite pass $P_1$, where a set of vanes point radially outward as an arrowhead, there is some free communication between the two displacement sections of the device. As a consequence of these peculiarities, the embodiment shown in FIG. 4 has been adapted to produce only a single displacement. To prevent a second displacement from occurring, the pass $P_1$ which would normally appear at the left in FIG. 4, has been widened to allow fluid to bypass the vanes so as to cancel any would-be compression at this point. As may be seen, this is accomplished by removing the apex of the fixed core 460 at this pass. Alternatively, the housing wall could have been relieved here to achieve the same purpose. As a result, the device requires but one intake port 443 and one exhaust port 444, as are shown at the right in FIG. 4, to produce a single but efficient volumetric displacement. A pressurized fluid such as steam, therefore, if applied to the intake port would produce positive expansion of the spaces between the vanes so as to impart rotation to the wheels. In addition, the blade-like vanes would efficiently utilize the dynamic energy of the steam or applied fluid, as in an impulse turbine, but without leakage or free communication between intake and exhaust ports. From a dynamic fluid consideration, the canted vanes offer an improved efficiency over the cylindrical or triangular teeth of the previous embodiments.

As a liquid pump, the device has considerable intake suction, and in relation to centrifugal or conventional gear pumps, has the capability to effect an appreciable lift without priming. In contrast to conventional gear pumps where only a single tooth is engaged and the remaining spaces act only as fluid conveyors, the present and preceding embodiments provide high efficiency because all teeth are simultaneously engaging for displacement purposes. The multiple engagement of all sets of teeth or vanes in the wheels thus provides quiet operation and low wear rates.

In FIG. 4 and the succeeding embodiments of the invention, details of construction which are omitted in the drawings or in the specification are typical of those described in the preceding embodiments.

Figure 5:
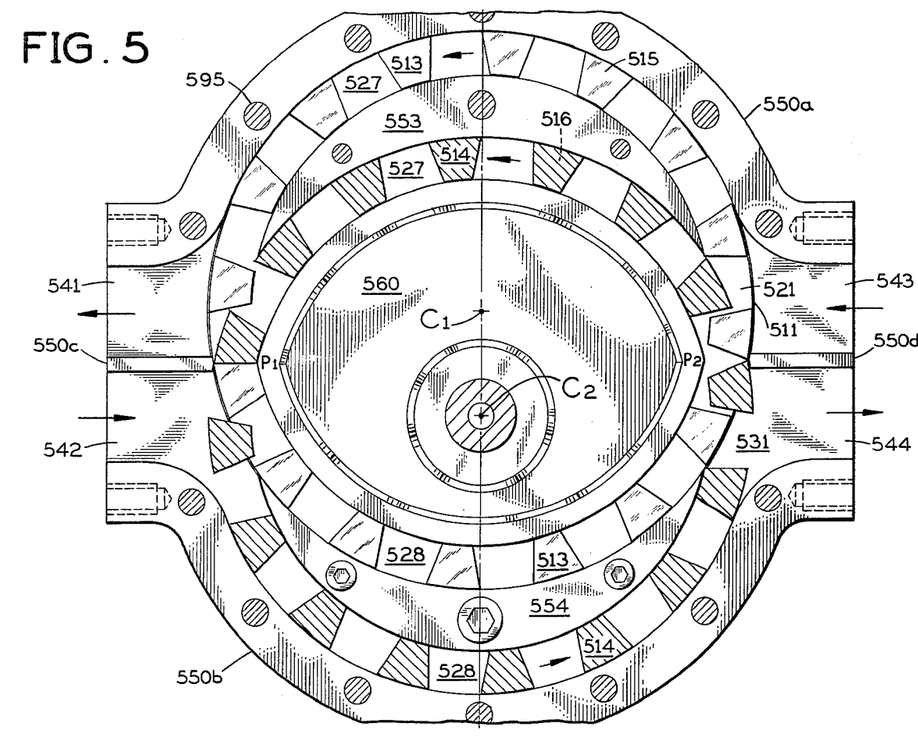
FIG. 5 is an interior axial view of a 4-port displacement device employing fixed crescents between the gear wheels.

In FIG. 5, an embodiment of the invention is shown which reveals another arrangement of tooth meshing. As may be seen, a pair of gear wheels 511, 512 again having sixteen teeth each and a 1:1 speed ratio are employed, but here utilize a wider separation between wheel axes $C_1$, $C_2$ than in the previous embodiments. This separation is equal to twice the tooth width, measured tangentially, instead of the former relationship in which the distance between wheel axes was equal to one tooth width. This is equivalent to merely separating the wheels further so that the teeth engage in the next set of spaces. As a result, the teeth 513, 514 mesh only in the vicinity of the two passes $P_1$, $P_2$. At other points, the teeth are separated. To fill the two voids which are thus created between the wheels, fixed crescents 553, 554 are installed in these areas as fillers. It is to be noted that the crescents are centered symmetrically on the centerline through the wheel axes $C_1$, $C_2$. The crescents are attached, one to each end plate, the end plates being equivalent to those shown in FIG. 2. In the present embodiment, however, the wheels do not extend in radius past the outside diameter of the tooth circle, otherwise, interference would occur with the structure supporting the fixed crescents. The faces 515, 516 of the teeth now no longer remain in continuous contact with the face 521, 522 of the opposite wheel, so that during half of the rotative cycle they move into facial contact with the surrounding spacer plates. It would appear that this might induce some additional friction as the faces of the teeth now rotate more in contact with fixed surfaces, but this is negated, at least partially, by the wheels being relatively smaller in diameter than those employed in the previous embodiments.

It may also be observed in FIG. 5 that the fixed crescents 553, 554 are identical to each other and that the curved surfaces thereof are defined by two arcs. The outer surface of each crescent has the same curvature as the inside diameter of the tooth circle of the gear wheels, while the inner surface is equal to the outside diameter of the tooth circle. This allows the inner and outer tooth surfaces to be now configured as pure radii circumscribed from the wheel centers $C_1$, $C_2$, an advantage in manufacturing relating to integral teeth where these surfaces may now be lathe-turned. The sides of the keystone-shaped teeth in this embodiment are flat surfaces and, therefore, may be straight-cut in a simple index milling set-up.

Figure 6:
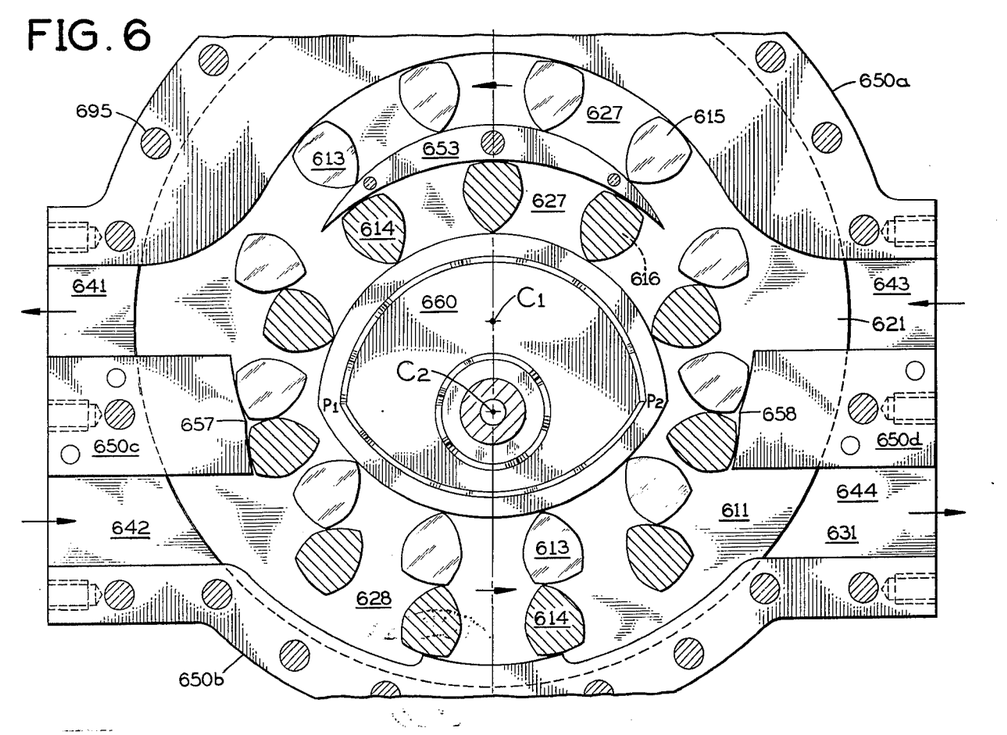
FIG. 6 is an interior axial view of a 4-port device designed with an unequal number of teeth in the gear wheels.

It is also possible to construct a device in accordance with the principles of the invention wherein a pair of gear wheels operate with a difference of speed. Such a device is shown in FIG. 6 where the upper gear wheel 611 thereof employs twelve teeth 613 while the lower wheel 612 has eleven teeth 614. Because of the tooth difference, the lower wheel is smaller in diameter and rotates faster by a ratio of the number of teeth in the wheels. The boat-shaped teeth of the wheels no longer remain in matched sets as in the previous embodiments, but instead, a whole new pairing of teeth is made upon each complete revolution of the larger wheel. A single fixed crescent 653 is employed between the wheels, like the type in the FIG. 5 embodiment, inasmuch as the teeth of each wheel now engage one another through an arc equal to approximately one-half of the wheel circumference. It may be noted, therefore, that in order for the volumetric spaces 627, 628 to expand and contract twice, the larger wheel must be turned through one complete revolution.

A fewer number of teeth are used in the embodiment of FIG. 6 in contrast to the preceding embodiments to illustrate how increased free communication or transfer leakage can occur through the passes $P_1$, $P_2$. The leakage at each pass relates not to a tooth difference but rather to having fewer teeth and consequently wider tooth spaces per wheel. When a greater number of teeth are employed the arc or angle through which transfer leakage occurs is diminished. In the engine embodiment of FIG. 1, leakage across the pass $P_1$ is also restricted by the combustion region being at a higher working pressure than the compression region.

The method of tooth profile development in all embodiments of the invention except that shown by FIG. 5 has been done by the well known means of rolling one Cardan circle about the exterior of a second such fixed circle. In the embodiments of FIGS. 1–4 the fixed and rolling circles are both of the same size and equal in diameter to the separation between the gear wheel axes $C_1$, $C_2$. A generating point attached to the rolling circle is analogous to one of the apices on a tooth of one gear wheel as it describes its locus about a mating tooth on the opposite wheel. Since the generating point is outside of the rolling circle, the resultant curve may be classified as a curtate epitrochoid. (Reference is made to "The Kinematics of Machinery", page 592, by Franz Reuleaux, Dover Publications, N.Y., for a further understanding of trochoidal curves.) The convex sides of the triangular toothform in FIG. 3, for example, are the result of sequential generation by the three apices of the mating tooth of the opposite wheel, each apex representing a new generating point of the Cardan circle. Because there is a total of six apices on two mating teeth as they relatively slide about one another, each apex only traces on the mating tooth during one-sixth or 60° of rotation of the gear wheels. Each apex of the quasi-elliptical teeth of the embodiment of FIG. 4 trace for only 90° of wheel rotation. The circular teeth in FIG. 1 represent, however, a special case of tooth development where the apices are not distinctly obvious. Instead, a point on a circular tooth which is in contact with a mating tooth is instantly describing its mating surface. A fraction of a degree of rotation of the wheels later a new instant apex close to the previous point on the same tooth is now describing a new locus such that the resultant mating teeth may now be represented as a pair of circles which slide about one another during rotation of the gear wheels. As should be obvious, the concept of an instant apex which is continuously changing position with respect to its tooth and wheel is in contrast to other embodiments of the invention having toothforms with fixed apices, where these apices describe curves on mating teeth during some more finite angle of rotation of the gear wheels. The generations by either the fixed or instant type of apices as here defined may thus be classified as epitrochoidal curves. Also classified as epitrochoidal generations are the teeth of the FIG. 6 embodiment where these may be similarly developed using Cardan circles but of unequal size whose ratio of diameters is equal to the ratio of the number of teeth in the wheels. Toothforms other than the five principal types shown in the drawings may be configured by varying the number and position of tooth generating points or apices, without departing from the spirit of the invention.

The invention is characterized by a pair of gear wheels which mesh together to produce a dual volumetric displacement.

Having thus described my invention, I claim:

1. A positive displacement device employing a pair of parallel gear wheels which are rotatable on separated axes,
   gear teeth circularly disposed on the face of each of said wheels which teeth intermesh with said teeth on the opposite of said wheels,
   a housing and core member sealingly disposed between said wheels which define a generally annular track in which said teeth revolve,
   said teeth dividing said track into sealed working chambers whose volumes each contract and expand twice during one revolution of said wheels,
   and port means for providing the ingress and egress of fluid, respectively, to and from said chambers.

2. The device as defined in claim 1 adapted as a displacement gas turbine engine having means for producing combustion, including fuel introduction and ignition means, said ignition means including a spark plug disposed in the wall of said housing for the purpose of igniting compressed charge within said working chambers, said engine operating on the 4-stroke cycle whereby said chambers sequence continuously through the phases of intake, compression, expansion and exhaust.

3. The device as defined in claim 1 adapted as a combustion engine, pump or fluid motor to produce a dual volumetric displacement, said device being divided into two distinct displacement sections, each of which sections is comprised of said sealed chambers which are instantly disposed in opposite halves of said annular track, said sections each having separate intake and exhaust ports, for the compression or expansion of two separate fluids.

4. The device as defined in claim 1 adapted to produce only a single volumetric displacement, wherein one of the passes defined between said housing and said core member is widened or relieved to prevent a second displacement from occurring.

5. The device as defined in claim 1 in which said teeth are cylindrical pins whose circular cross sections are defined as epitrochoidal curves generated by like teeth disposed on the opposite of said gear wheels as said wheels rotate together in the same direction at a 1:1 uniform velocity ratio.

6. The device as defined in claim 1 in which said teeth have cross sections which are equilateral triangles having convex sides being defined as epitrochoidal curves generated by apices of like teeth disposed on the opposite of said gear wheels as said wheels rotate together in the same direction at a 1:1 uniform velocity ratio.

7. The device as defined in claim 1 in which said teeth are canted and have cross sections which are quasi-elliptical, the convex sides thereof being defined as epitrochoidal curves generated by apices of like teeth disposed on the opposite of said gear wheels as said wheels rotate together in the same direction at a 1:1 uniform velocity ratio.

8. The device as defined in claim 1 in which the separation between said axes of said gear wheels is approximately equal to the width of said teeth, measured tangentially.

9. The device as defined in claim 1 in which the separation between said axes of said gear wheels is approximately equal to twice the width of said teeth, measured tangentially, including fixed crescents which are installed as fillers between said wheels.

10. The device as defined in claim 1 in which said teeth of said gear wheels are unequal in number such that said wheels rotate with a difference of speed, including at least one fixed crescent installed as a filler between said wheels.

11. The device as defined in claim 1 having means for sealingly applying fluid pressure to the back surfaces of said wheels, means, including nozzle means, for spraying coolant onto said back surfaces for the purpose of creating pressure to cancel thrust loads oppositely applied to said wheels by compression and combustion forces and for the purposes of cooling and lubricating said wheels.

12. The device as defined in claim 2 having orifice means common to said sealed working chambers which are experiencing said expansion phase for the purpose of admitting steam to increase the mean effective pressure of the gas within said chambers.

13. A positive displacement machine employing a pair of parallel gear wheels which are rotatable on separated axes, gear teeth circularly disposed on the face of each of said wheels which teeth project to the opposite of said wheels and intermesh with said teeth thereof, a housing member sealingly disposed between said wheels enclosing said teeth thereof and whose interior surfaces are configured as parallel intersecting cylinders, said axes of said wheels being coincident, respectively, with the axes of said cylinders, a core member sealingly disposed between said wheels and supported within the cage defined by said teeth of said wheels, said core having exterior curved surfaces which are intersecting arcs circumscribed respectively from said axes of said wheels, said housing and core members in conjunction defining a generally annular track in which said teeth revolve, said teeth effecting sealing contact with said opposite wheel and with said teeth thereof and with said interior cylindrical surfaces of said housing and with said exterior curved surfaces of said core to divide said track into sealed working chambers whose volumes each contract and expand twice during one revolution of said wheels, and port means for providing the ingress and egress of fluid, respectively, to and from said chambers.

* * * * *